(12) United States Patent  (10) Patent No.: US 8,914,050 B2
Jung et al.  (45) Date of Patent: Dec. 16, 2014

(54) BASE STATION, MOBILE STATION, PAGING MESSAGE TRANSMITTING METHOD, AND PAGING MESSAGE RECEIVING METHOD

(75) Inventors: Soojung Jung, Daejeon (KR); Eunkyung Kim, Daejeon (KR); Jae Sun Cha, Daejeon (KR); Sung Cheol Chang, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 143 days.

(21) Appl. No.: 13/642,334

(22) PCT Filed: Apr. 20, 2011

(86) PCT No.: PCT/KR2011/002832
§ 371 (c)(1),
(2), (4) Date: Oct. 19, 2012

(87) PCT Pub. No.: WO2011/132934
PCT Pub. Date: Oct. 27, 2011

(65) Prior Publication Data
US 2013/0029697 A1   Jan. 31, 2013

(30) Foreign Application Priority Data

Apr. 20, 2010  (KR) .......................... 10-2010-0036427
Apr. 20, 2011  (KR) .......................... 10-2011-0036685

(51) Int. Cl.
*H04W 68/00* (2009.01)
(52) U.S. Cl.
CPC .................................. *H04W 68/00* (2013.01)
USPC ............................. 455/458; 370/311; 370/329

(58) Field of Classification Search
USPC .............. 455/458–459, 422.1, 509; 370/311, 370/328, 329
See application file for complete search history.

(56) References Cited

U.S. PATENT DOCUMENTS

| 2006/0116123 | A1 | 6/2006 | Purnadi et al. |
| 2009/0280848 | A1 | 11/2009 | Park et al. |
| 2010/0041393 | A1 | 2/2010 | Kwon et al. |
| 2011/0134893 | A1 | 6/2011 | Park et al. |
| 2011/0159905 | A1* | 6/2011 | Zheng .......................... 455/509 |
| 2011/0261712 | A1 | 10/2011 | Park et al. |
| 2011/0292856 | A1* | 12/2011 | Park et al. ..................... 370/311 |
| 2011/0299469 | A1* | 12/2011 | Kang et al. .................... 370/328 |

FOREIGN PATENT DOCUMENTS

| JP | 2007-312134 A | 11/2007 |
| KR | 10-2007-0086714 A | 8/2007 |
| KR | 10-2009-0117572 A | 11/2009 |
| KR | 10-2010-0020749 A | 2/2010 |
| KR | 10-2010-0024332 A | 3/2010 |
| KR | 10-2010-0057473 A | 5/2010 |

* cited by examiner

*Primary Examiner* — Kashif Siddiqui
(74) *Attorney, Agent, or Firm* — Rabin & Berdo, P.C.

(57) ABSTRACT

A base station allocates a paging group to a mobile station. The base station transmits, to a mobile station, a first message including indices of a plurality of carriers and information for the plurality of carriers and a second message including paging group information representing whether each of a plurality of carriers supports each of one or more paging groups. Then, the base station selects a paging transmission carrier for the mobile station from among at least one paging carrier corresponding to the paging group allocated to the mobile station and transmits the paging message through the paging transmission carrier.

10 Claims, 9 Drawing Sheets

BASE STATION, MOBILE STATION, PAGING MESSAGE TRANSMITTING METHOD, AND PAGING MESSAGE RECEIVING METHOD

TECHNICAL FIELD

The present invention relates to a base station and a mobile station.

Particularly, the present invention relates to a paging message transmitting method of the base station and a paging message receiving method of the mobile station.

BACKGROUND ART

In a mobile communication system, a paging group information message (PGID_Info message) corresponding to a broadcast message can be used for providing paging-related information of the base station. The paging group information message can be transmitted through all carriers (or frequency assignment (FA)s or component carriers) supported by the base station.

The paging group information message can include fields shown in Table 1.

TABLE 1

| Name | Value |
| --- | --- |
| Num_PGIDs | Number of paging groups in the base station |
| PGID | Identifier of paging groups 0-216 |
| m | Time domain hash parameters 1-4 used to determine the frame number of a superframe for paging message transmission of an idle mode AMS. |

In Table 1, the Num_PGIDs field represents the number of paging groups supported by the base station. The PGID field represents a paging group identifier. The paging group information message can include a plurality of paging group identifiers. The number of paging group identifiers can corresponds to the number represented by the Num_PGIDs field. The m field represents a time domain hash parameter which the mobile station uses to determine a frame number for transmitting a paging message among multiple frames within a superframe including a paging reception interval.

On the other hand, the base station can provide information necessary for multicarrier support to the mobile station through a global carrier configuration message such as an AAII_Global_Config message and a multicarrier advertisement message such as an AAI_MC_ADV message.

The global carrier configuration message is a message for providing carrier information for all available carriers in a network that the base station belongs to. The global carrier configuration message provides information on the entire number of carrier groups in the network composed of adjacent carriers continuously located in a frequency region and information on individual carriers composing each carrier group. The carrier group information includes bandwidth of component carriers of each carrier group, and start frequency information. The individual carrier information includes a physical carrier index and information on the duplexing mode. The physical carrier index is for identifying all carriers supported by the network to which the corresponding base station belongs. After the mobile station performs initial access to a system through the base station, the base station transmits the global carrier configuration message to the mobile station. All base stations that belong to the same network provide the global carrier configuration messages with the same content. The multicarrier advertisement message provides information on multiple carriers that the base station can support. By using the physical carrier index provided through the global carrier configuration message, the multicarrier advertisement message provides information on a secondary advanced preamble index (SA-preamble index), a MAC protocol version, a super frame header (SFH), etc. for each of carriers which the base station can support.

In a mobile wireless access system supporting multicarriers, mobile stations in an idle mode state within the base station can receive a paging message through different carriers. Also, the base station can only use some carriers among multiple carriers supported by the base station to transmit the paging message.

It is necessary to provide information for determining a carrier for transmitting the paging message of the corresponding mobile station and information on carriers used for transmitting paging messages within the base station so that the mobile station can receive the paging message in the idle mode. A carrier which is used for transmitting the paging message of the corresponding mobile station can be determined by using a specific equation.

However, the conventional paging group information message, global carrier configuration message, and multicarrier advertisement message do not provide paging-related information on each of carriers necessary for transmitting the paging message through multiple carriers.

DISCLOSURE

Technical Problem

The present invention has been made in an effort to provide a method having advantages of providing paging-related information to a mobile station when a paging message is transmitted through multicarriers and using the same so that the paging message is received without loss.

Technical Solution

An embodiment of the present invention provides a method for a base station to transmit a paging message. The method includes: transmitting a first message including indices of a plurality of carriers and information for the plurality of carriers to a mobile station; allocating a paging group to the mobile station; transmitting a second message including paging group information representing whether each of the plurality of carriers supports each of one or more paging groups, to the mobile station; selecting a paging transmission carrier for the mobile station among one or more paging carriers corresponding to the paging group allocated to the mobile station; and transmitting the paging message through the paging transmission carrier.

The selecting of the paging transmission carrier may include selecting the paging transmission carrier based on the number of one or more paging carriers corresponding to the paging group allocated to the mobile station.

The second message may further include identifiers of the one or more paging groups.

Here, the paging group information may be one or more bitmaps if the one or more paging groups do not have the same paging carriers, and the one or more bitmaps may correspond to the one or more paging groups, respectively.

Meanwhile, each of the one or more bitmaps may represent whether each of the plurality of carriers corresponds to a paging carrier used for transmitting the paging message for a corresponding paging group. Here, the first message may correspond to a unicast message for providing information of all available carriers in a network, and the size of each of the one or more bitmaps may be equal to the number of all the available carriers.

Meanwhile, if the one or more paging groups have the same paging carrier, the paging group information may correspond to one bitmap. The one bitmap may represent whether each of the plurality of carriers corresponds to a paging carrier used for transmitting the paging message for the one or more paging groups.

Also, the paging group information may include a paging carrier indication bitmap representing whether each of the plurality of carriers corresponds to a paging carrier and one or more paging groups support bitmaps which correspond to the one or more paging groups, respectively. Here, the paging groups supporting bitmaps may represent whether each of one or more paging carriers represented by the paging carrier indication bitmap supports a corresponding paging group.

Another embodiment of the present invention provides a method for a mobile station to receive a paging message. The method includes: receiving a first message including indices of a plurality of carriers and information for the plurality of carriers from a base station; receiving allocation of a paging group from the base station; receiving a second message including paging group information representing whether each of the plurality of carriers supports each of one or more paging groups, from a base station; selecting a paging transmission carrier for the mobile station among one or more paging carriers corresponding to the paging group allocated to the mobile station; and monitoring the paging message through the paging transmission carrier.

The selecting of the paging transmission carrier may include selecting the paging transmission carrier based on the number of one or more paging carriers corresponding to the paging group allocated to the mobile station.

The second message may further include identifiers of the one or more paging group identifier. The paging group information may be one or more bitmaps if the one or more paging groups do not have the same paging carriers, and the one or more bitmaps may correspond to the one or more paging groups, respectively. Here, each of the one or more bitmaps may represent whether each of the plurality of carriers corresponds to a paging carrier used for transmitting the paging message for a corresponding paging group.

The first message may correspond to a unicast message for providing information of all available carriers in a network, and the size of each of the one or more bitmaps may be equal to the number of all the available carriers.

The second message may further include identifiers of the one or more paging group identifiers, and if the one or more paging groups have the same paging carrier, the paging group information may correspond to one bitmap. Here, the one bitmap may represent whether each of the plurality of carriers corresponds to a paging carrier used for transmitting the paging message for the one or more paging groups. The second message may further include identifiers of the one or more paging group identifiers. Here, the paging group information may include a paging carrier indication bitmap representing whether each of the plurality of carriers corresponds to a paging carrier, and one or more paging groups support bitmaps which correspond to the one or more paging groups, respectively. Also, the paging group support bitmap may represent whether each of one or more paging carriers represented by the paging carrier indication bitmap supports a corresponding paging group.

Yet another embodiment of the present invention provides a method for a base station to transmit a paging message. The method includes: transmitting a control message including paging group information representing whether each of a plurality of carriers supports each of one or more paging groups, to the mobile station; allocating a paging group to the mobile station; selecting a paging transmission carrier for the mobile station among one or more paging carriers corresponding to the paging group allocated to the mobile station; and transmitting the paging message through the paging transmission carrier.

The selecting of the paging transmission carrier may include selecting the paging transmission carrier based on the number of one or more paging carriers corresponding to the paging group allocated to the mobile station.

Here, the paging group information may include indices of the plurality of carriers, the number of one or more paging groups which the plurality of carriers support, and identifiers of the one or more paging groups. The control message may correspond to a broadcast message for providing paging group information.

The plurality of carriers may correspond to carriers supported by the base station, and the control message may correspond to a broadcast message for providing carrier information of the base station.

The first message may correspond to a message for providing information of a neighbor base station.

The paging group information may include identifiers of the one or more paging groups, and identifiers of one or more paging carriers supporting each of the one or more paging groups.

Yet another embodiment of the present invention provides a method for a mobile station to receive a paging message. The method includes: receiving a control message including indices of a plurality of carriers, the number of one or more paging groups supported by the plurality of carriers, and identifiers of the one or more paging groups, from a base station; receiving allocation of a paging group from the base station; selecting a paging transmission carrier for the mobile station among one or more paging carriers corresponding to the paging group allocated to the mobile station; and monitoring the paging message through the paging transmission carrier.

The selecting of the paging transmission carrier may include selecting the paging transmission carrier based on the number of one or more paging carriers corresponding to the paging group allocated to the mobile station.

Advantageous Effects

According to the embodiments of the present invention, it is possible to efficiently inform a mobile station of related information when a paging message is transmitted through multicarriers. Further, the mobile station can receive the paging message without loss by using the related information.

MODE FOR INVENTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, in addition, unless explicitly described to the contrary, the word "comprise" and variations such as "comprises" or "comprising" will be understood to imply the inclusion of stated elements but not the exclusion of any other elements.

In this specification, a mobile station (MS) may refer to a terminal, a mobile terminal (MT), a subscriber station (SS), a portable subscriber station (PSS), user equipment (UE), or an access terminal (AT). The mobile terminal may include all or part of the functions of the mobile station, the subscriber station, the portable subscriber station, and the user equipment. In this specification, a base station (BS) may refer to an access point (AP), a radio access station (RAS), a node B, a base transceiver station (BTS), or an MMR (mobile multihop relay)-BS. The base station may include all or part of the functions of the access point, the radio access station, the node B, the base transceiver station, and the MMR-BS.

Methods for transmitting and receiving a paging message according to embodiments of the present invention will be described with reference to the drawings.

For paging thorough multiple carriers, a base station has a need to transmit parameters as in Table 2 to a mobile station through a paging group information message, a global carrier configuration message, a multicarrier advertisement message, and others.

TABLE 2

| Parameter | Description |
| --- | --- |
| Paging carrier indicator | Indicator for representing whether each carrier supported by a base station supports a paging message transmission |
| Physical carrier indicator | Separator Information of carrier used for transmitting a paging message |
| Paging group information | Paging group information supported by each carrier of a base station |
| N | Total number of carriers used for transmitting a paging message by a base station |
| PG_uniformity flag | Indicator for supporting the same paging group |

Next, referring to FIG. 1, a method for transmitting/receiving a paging message according to the first embodiment of the present invention will be described.

Figure 1:
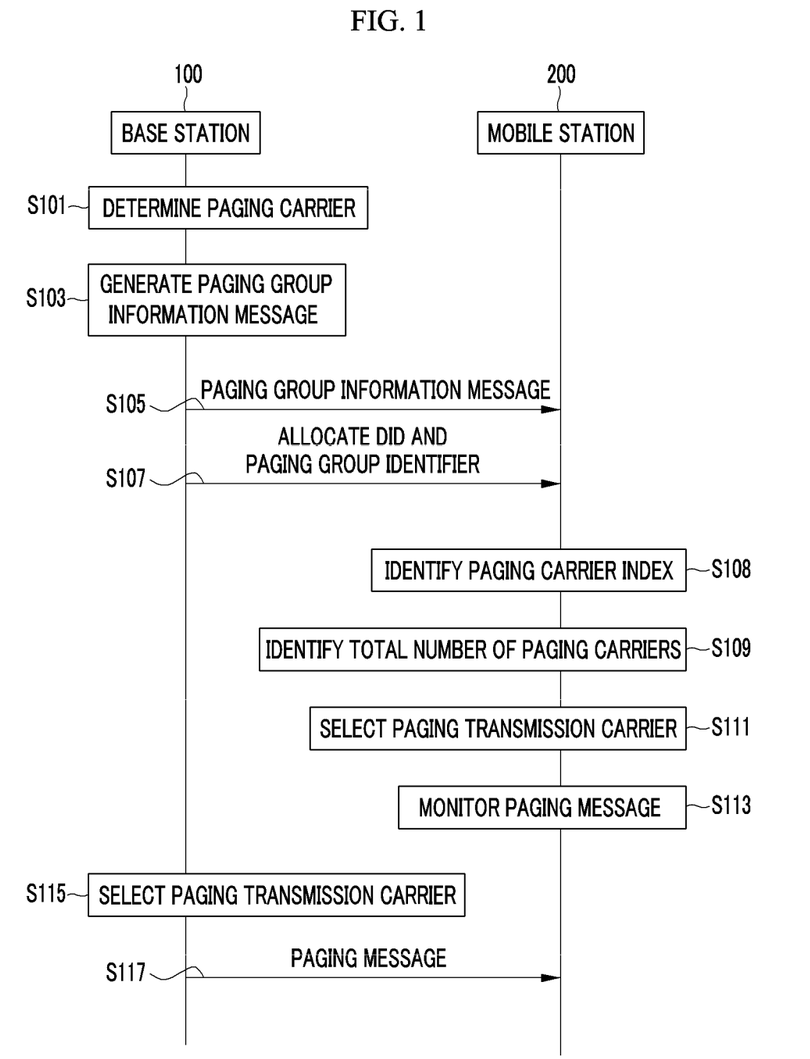
FIG. 1 shows a method for paging according to the first embodiment of the present invention.

FIG. 1 shows a method for paging according to the first embodiment of the present invention.

According to an embodiment of FIG. 1, a base station transmits information for paging through multicarriers to a mobile station by using a paging group information message.

First, the base station determines at least one paging carrier used for transmitting a paging message for each of at least one paging group (S101).

In order to notify the index of the determined paging carrier for each of at least one paging group to a mobile station, the base station generates a paging group information message including information on the paging carrier (S103).

Table 3 shows fields included in the first example of the paging group information message according to the first embodiment of the present invention.

TABLE 3

| Name | Value |
| --- | --- |
| Num_PGIDs | Number of paging groups in the ABS |
| m | Time domain hash parameters (1-4) used to determine the frame number of a superframe for paging message transmission of an idle mode AMS. |
| For (i=0;i<Num_PGIDs;i++){ | Present if Num_PGIDs > 0 |
|     PGID | Identifier of paging groups (0-216) |
|     Num_carrier_PG | |
|     For (j=0;j<Num_carrier_PG){ | |
|         Physical carrier index(s) | Identifier(s) of carrier used to transmit paging message for each PG |
|     } | |
| } | |

As shown in Table 3, the paging group information message according to the first example of the first embodiment of the present invention includes a paging group number field (Num_PGIDs), a time domain hash parameter field (m), a paging group identifier field of each paging group (PGID), a paging group number field (Num_PGIDs), the number field of carriers included in of each paging group (Num_carrier_PG), and a physical carrier index field for at least one paging carrier included in each paging group (Physical carrier index(s)). The Num_carrier_PG field corresponds to a parameter N.

Table 4 shows fields included in the second example of the paging group information message according to the first embodiment of the present invention.

TABLE 4

| Name | Value |
| --- | --- |
| m | Time domain hash parameters (1-4) used to determine the frame number of a superframe for paging message transmission of an idle mode AMS. |
| Num_PG_carrier | Number of carriers used to transmit paging message |
| PG_uniformity flag | 1: All carriers supported by serving ABS have the same paging group<br>0: Otherwise |
| For (i=0;i<Num_PG_carrier;i++){ | Present if Num_PG_carrier > 0 |
|     Physical carrier index | |
|     Num_PGIDs | Number of paging groups in a carrier |
|     For (j=0;j<Num_PGID){ | Present if Num_PGIDs > 0<br>If PG_uniformity flag = 1, this information is provided only once |
|         PGID | Identifier of paging groups (0-216) |
|     } | |
| } | |

As shown in Table 4, the paging group information message according to the second example of the first embodiment of the present invention includes a time domain hash parameter field (m), a paging carrier number field (Num_PG_carrier), a paging group uniformity flag (PG_uniformity flag), a physical carrier index field for at least one paging carrier included in each paging group (physical carrier index(s)), a paging group number field (Num_PGIDs), and a paging group identifier field of each paging group (PGID), Particularly, when paging groups supported by each carrier in a base stations are the same, the paging group uniformity flag (PG_uniformity flag) is set as "1", and information on an identifier (PGID) of at least one paging group per each carrier may be provided only once. The total number N of paging carriers included in each paging group may be determined through the analysis of the paging group message according to the second example of the first embodiment of the present invention.

The base station transmits the paging group information message to a mobile station through all carriers supported by the base station in a broadcast fashion (S105).

Meanwhile, the base station allocates a deregistration identifier (DID) and a paging group identifier to a mobile station that is entering an idle mode (S107).

A mobile station identifies an index of at least one paging carrier for the paging group to which the mobile station belongs through the paging group information message (S108).

The mobile station identifies the total number N of paging carriers for the paging group to which the mobile station belongs through the paging group information message (S109).

The mobile station selects, as a paging transmission carrier, one from among the at least one paging carrier index included in the paging group to which the mobile station belongs by using the parameter N and a predetermined equation (S111). The mobile station may use the following Equation 1.

$$\text{Paging carrier index} = \text{DID modulo } N. \quad \text{(Equation 1)}$$

When using Equation 1, the mobile station obtains the remainder (r) obtained by dividing the DID by N, and selects, as a paging transmission carrier, the r-th paging carrier index from among at least one paging carrier index included in the paging group to which the mobile station belongs.

The mobile station monitors a paging message through the paging transmission carrier (S113).

After this, the base station selects a paging transmission carrier for the mobile station from among at least one paging carrier of the paging group to which the mobile station belongs by using a predetermined equation (S115). The base station may also use Equation 1.

The base station transmits a paging message through the selected paging transmission carrier to the mobile station in a broadcast fashion (S117).

Next, referring to FIGS. 2 to 5, a method for transmitting/receiving a paging message according to the second embodiment of the present invention will be described.

Figure 2:
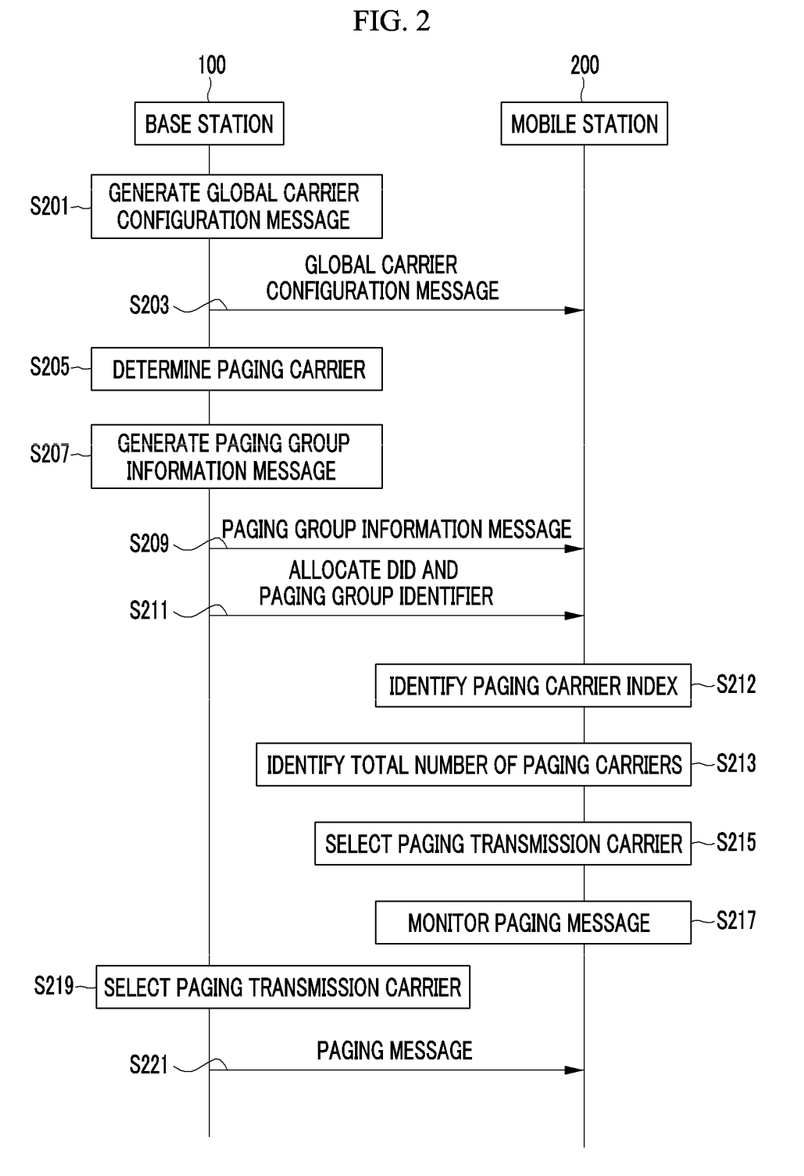
FIG. 2 shows a method for paging according to the second embodiment of the present invention.

FIG. 2 shows a method for paging according to the second embodiment of the present invention.

According to the embodiment as in FIG. 2, a base station transmits, to a mobile station, information for paging thorough multiple carriers by using a global carrier configuration message and a paging group information message. A mobile station in an idle mode may identify paging carriers by using information of a global carrier configuration message that was received before it has been changed into the idle mode, and may determine a carrier through which a paging message for the mobile station is transmitted.

First, the base station generates a global carrier configuration message that informs a mobile station about physical carrier indices of all carriers that are available within a network to which the base station belongs (S201), and transmits the global carrier configuration message to the mobile station in a unicast fashion (S203). The mobile station may receive the global carrier configuration message before it is changed to be in an idle mode.

Table 5 shows fields included in the global carrier configuration message according to the second embodiment of the present invention.

TABLE 5

| Field | Size (bit) | Description |
|---|---|---|
| MAC Control Message Type | 8 | |
| Number of Carrier Groups | 4 | Groups of contiguous carriers |
| For (i=0;i<Number of Carrier Groups; i++){ | | |
|    Multicarrier Configuration Index Across the Network | 6 | |
|    Start Frequency Assignment Index | 6 | Frequency Assignment Index of the first carrier in carrier group #i |
|    Number of Carriers | 6 | |
|    For (j=0;j<Number of Carriers;j++){ | | |
|      Physical Carrier Index | 6 | |
|      Duplexing Mode | 1 | "0" for TDD "1" for FDD |
|    } | | |
| } | | |

As shown in Table 5, the global carrier configuration message according to the second embodiment of the present invention includes a MAC control message type field, a carrier group number field, a multicarrier configuration index field of each carrier group, a start frequency allocation index field of each carrier group, a carrier number field of each carrier group, physical carrier indices belonging to each carrier group, and a duplexing mode field of each physical carrier index.

The base station determines, for each of at least one paging group, at least one paging carrier used for transmitting a paging message (S205).

The base station generates a paging group information message including information on paging carriers to inform a mobile station of at least one paging carrier index for each of at least one paging group (S207).

Table 6 shows fields included in the paging group information message according to the second embodiment of the present invention.

TABLE 6

| Name | Value |
|---|---|
| Num_PGIDs | Number of paging groups in the ABS |
| m | Time domain hash parameters (1-4) used to determine the frame number of a superframe for paging message transmission of an idle mode AMS. |
| PG_uniformity flag | 1: All carriers supported by serving ABS have the same paging group 0: Otherwise |
| For (i=0;i<Num_PGIDs;i++){ | |

TABLE 6-continued

| Name | Value |
|---|---|
| PGID<br>}<br>For (i=0;i<Num_PGIDs;i++){<br>Paging carrier indication bits<br><br><br><br><br><br><br><br>} | Identifier of paging groups (0-216)<br><br><br>This bitmap is used to specify if carriers support specific paging group (PG) in the ABS or not. Multiple paging carrier indication bits are provided and each paging carrier indication bits corresponds to each PG.<br>If PG_uniformity flag is set, only one paging carrier indication bit is provided.<br>The value N per PG used to determine whether the paging carrier index is equal to the number of bits set to 1 in each paging carrier indication bit |

As shown in Table 6, the global carrier configuration message according to the first example of the second embodiment of the present invention includes a paging group number field (Num_PGIDs), a time domain hash parameter field (m), a paging group uniformity flag (PG_uniformity flag), a paging group identifier (PGID) of each paging group, and a paging carrier indication bitmap (Paging carrier indication bits) for each paging group.

When paging groups supported by each carrier in a base station are the same, the paging group uniformity flag (PG_uniformity flag) is set as "1", and the paging carrier indication bitmap (Paging carrier indication bits) for each paging group may be provided once.

The base station transmits the paging carrier index to the mobile station through a bit map corresponding to the paging carrier indication bit(s) field.

The base station transmits paging carrier indices of paging carriers to the mobile station through the bitmap corresponding to the paging carrier indication bits field.

Next, referring to FIG. 3, a method for interpreting a bitmap will be described.

Figure 3:
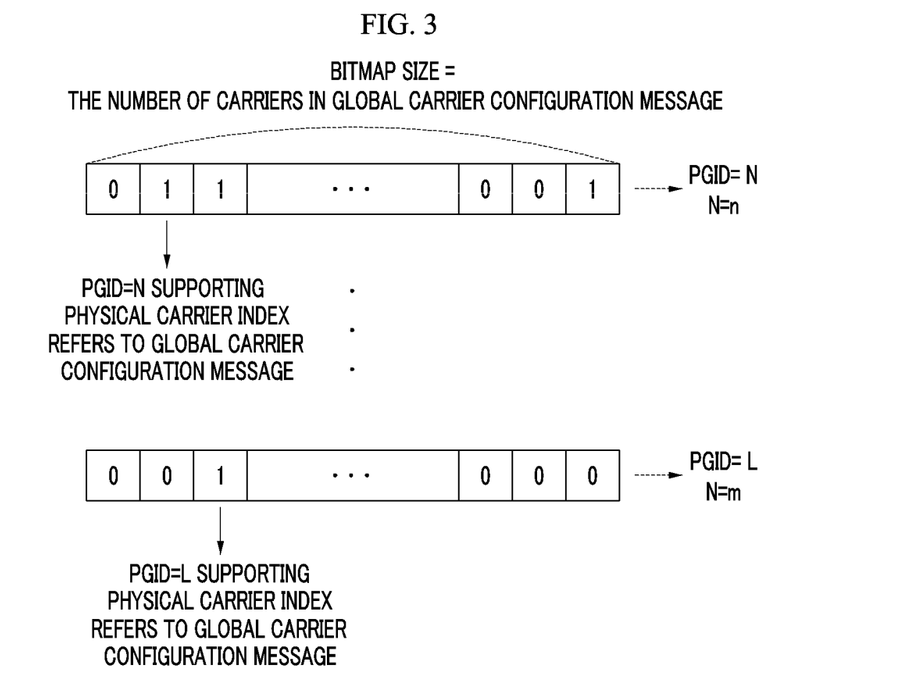
FIG. 3 shows a method for interpreting a bitmap included in the first example of a paging group information message according to the second embodiment of the present invention.

FIG. 3 shows a method for interpreting a bitmap included in the paging group information message according to the first example of the second embodiment of the present invention.

As shown in FIG. 3, the length of the bitmap is equal to the number of carriers in the global carrier configuration message. The k-th bitmap of the paging group information message corresponds to the k-th PGID) of the paging group information message. The i-th bit of each bitmap corresponds to the physical carrier index of the i-th carrier in the global carrier configuration message such as the AAI_Global_Config message. That is, the i-th bit set as "1" indicates that the paging message of the base station is transmitted through the i-th carrier of the global carrier configuration message (AAI_Global_Config message). In this case, the number of bits set as "1" corresponds to the number N of all carriers that the base station uses to transmit a paging message for the k-th PGID.

Table 7 shows fields included in the paging group information message according to the second example of the second embodiment of the present invention.

TABLE 7

| Name | Value |
|---|---|
| Num_PGIDs | Number of paging groups in the ABS |
| m | Time domain hash parameters (1-4) used to determine the frame number of a superframe for paging message transmission of an idle mode AMS. |
| PG_uniformity flag | 1: All carriers supported by serving ABS have the same paging group<br>0: Otherwise |
| For (i=0;i<Num_PGIDs;i++){<br>PGID<br>}<br>Paging carrier indication bits<br><br><br><br><br><br><br><br><br><br>For (i=0;i<Num_PGIDs;i++){<br>PG_bits<br><br><br><br><br><br><br><br><br><br><br><br>} | <br><br>Identifier of paging groups (0-216)<br><br>This bitmap is used to specify if carriers are a paging carrier in the ABS or not.<br>The size of paging carrier indication bitmap equals to the number of carriers in the AAI_Global-Config message.<br>The physical carrier index of each bit in bitmap corresponds to the ascending order of physical carrier index of the carriers in the AAI_Global-Config message.<br><br><br>This bitmap is used to specify if carriers support specific paging group in the ABS or not. Multiple PG_bits are provided and each PG_bits corresponds to each PG<br>If PG_uniformity flag is set, only one PG_bits is provided.<br>The size of PG_bits equals the number of bits set to 1 in the paging carrier indication bits<br>The value N for each PG used to determine whether the paging carrier index is equal to the number of bits set to 1 in each PG_bits (or is fixed to max. number of carriers in an ABS). |

As shown in Table 7, the global carrier configuration message according to the second example of the second embodiment of the present invention includes a paging group number field (Num_PGIDs), a time domain hash parameter field (m), a paging group uniformity flag (PG_uniformity flag), a paging group identifier (PGID) of each paging group, a paging carrier indication bitmap (Paging carrier indication bits), and a paging group support bitmap (PG_bits) for each paging group.

When paging groups supported by each carrier in a base station are the same, the paging group uniformity flag (PG_uniformity flag) is set as "1", and the paging carrier support bitmap (PG-bits) for each paging group may be provided once.

The base station transmits indices of paging carriers through a bitmap corresponding to the paging carrier indication bits field and a bitmap corresponding to the PG-bits field.

Next, referring to FIGS. 4 and 5, a method for interpreting a bitmap will be described.

Figure 4:
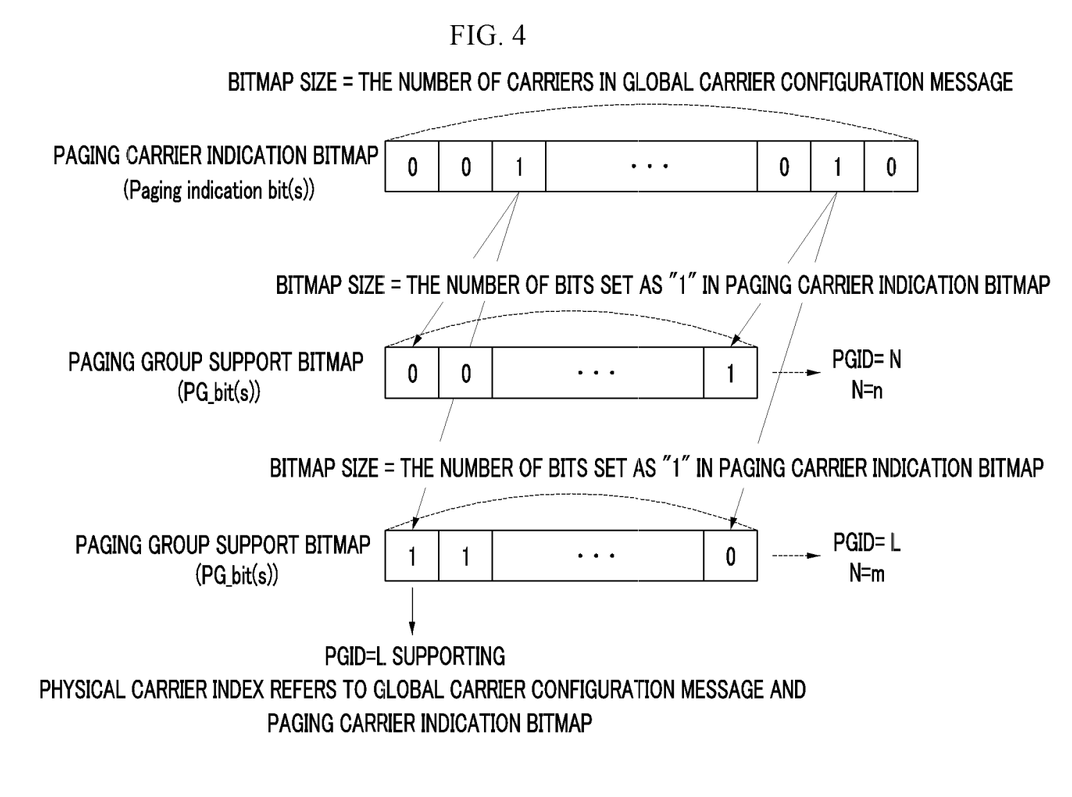
FIG. 4 shows a method for interpreting a bitmap included in the second example of a paging group information message according to the second embodiment of the present invention.

FIG. 4 shows a method for interpreting a bitmap included in the paging group information message according to second example of the second embodiment of the present invention.

The length of the paging carrier indication bitmap (the paging carrier indication bits) is equal to the number of carriers in the global carrier configuration message. The paging carrier indication bitmap (the paging carrier indication bits) represents a paging carrier index used for transmitting a paging message by the base station. That is, the i-th bit of the paging carrier indication bitmap corresponds to the physical carrier index of the i-th bit in the global carrier configuration message (AAI_Global_Config message).

The length of each paging group support bitmap (PG_bits) is equal to the number of bits set as "1" in the paging carrier indication bitmap (the paging carrier indication bits) of the base station. The k-th paging group support bitmap (PG_bits) of the paging group information message corresponds to the k-th PGID of the paging group information message. That is, the k-th paging group support bitmap (PG_bits) represents a paging carrier index used for transmitting a paging message for the k-th PGID. The j-the bit of each paging group support bitmap (PG_bits) represents the physical carrier index corresponding to the j-th bit among the bits set as "1" of the paging carrier indication bitmap.

That is, the j-the bit set as "1" represents that a paging message of the base station may be transmitted through the carrier corresponding to the j-th bits among the bits set as "1" in the paging carrier indication bitmap. In this case, the number of bits set as "1" in the k-th paging group support bitmap corresponds to the number N of all carriers used for transmitting a paging message for the K-the PGID by the base station.

Figure 5:
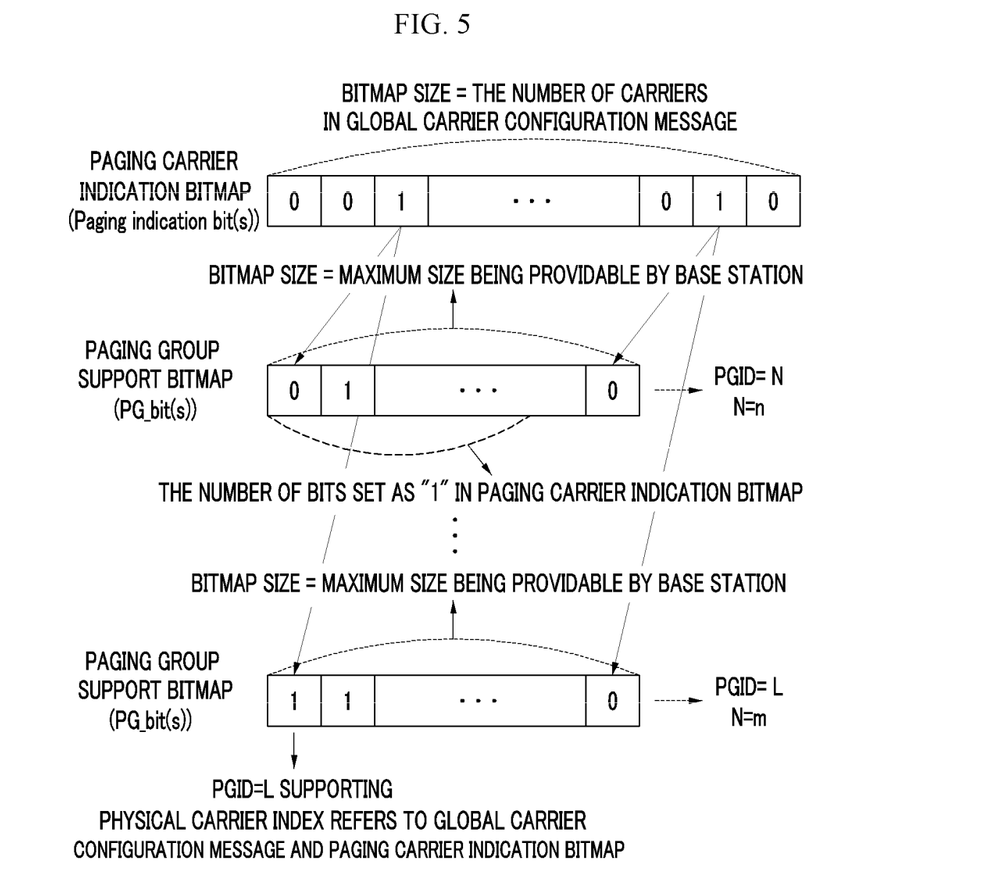
FIG. 5 shows another method for interpreting a bitmap included in the second example of a paging group information message according to the second embodiment of the present invention.

FIG. 5 shows another method for interpreting a bitmap included in the paging group information message according to second example of the second embodiment of the present invention.

The length of the paging carrier indication bitmap (Paging carrier indication bits) is equal to the number of carriers in the global carrier configuration message. The paging carrier indication bitmap (Paging carrier indication bits) represents a paging carrier index used for transmitting a paging message by the base station. That is, the i-th bit of the paging carrier indication bitmap corresponds to the physical carrier index of the i-th carrier in the global carrier configuration message (AAI_Global_Config message). The length of each paging group support bitmap (PG_bits) may be set as the maximum length that is capable of being provided by the base station. The k-th paging group support bitmap (PG_bits) of the paging group information message corresponds to the k-th PGID of the paging group information message.

That is, the k-th paging group support bitmap (PG_bits) represents the paging carrier index used for transmitting the paging message for the k-th PGID. The j-th bit of each paging group support bitmap (PG_bits) represents the physical carrier index corresponding to the j-th bit among the bits set as "1" in the paging carrier indication bitmap.

That is, the j-bit set as "1" in the k-th paging group support bitmap represents that a paging message may be transmitted through the carrier corresponding to the j-th bit among the bits set as "1" in the paging carrier indication bitmap. In this case, the number of bits set as "1" in the k-th paging group support bitmap corresponds to the number of carriers used for transmitting a paging message for the k-th PGID by the base station.

FIG. 2 is described again.

The base station transmits the generated paging group information message to the mobile station in a broadcast fashion (S209).

Meanwhile, the base station allocates a Deregistration identifier (DID) and a paging group identifier to the mobile station that is entering into an idle mode (S211).

The mobile station identifies at least one paging carrier index for the paging group to which the mobile station belongs through the global carrier configuration message and the paging group information message (S212).

The mobile station identifies the total number N of paging carriers of the paging group to which the mobile station belongs through the paging group information message (S213).

The mobile station selects one from among the at least one paging carrier index of the paging group to which the mobile station belongs by using a predetermined equation and the parameter N (S215). The mobile station may use Equation 1.

When using Equation 1, the mobile station obtains the remainder (r) obtained by dividing the DID by N, and selects, as a paging carrier index, the r-th paging carrier index from among at least one paging carrier index included in the paging group to which the mobile station belongs.

The mobile station monitors a paging message based on the paging transmission carrier corresponding to the selected paging carrier index (S217).

After this, the base station selects a paging transmission carrier for the mobile station from among at least one paging carrier of the paging group to which the mobile station belongs by using a predetermined equation (S219). The base station may also use Equation 1.

The base station transmits a paging message through the selected paging transmission carrier to the mobile station in a broadcast fashion (S221).

Next, referring to FIG. 6, a method for transmitting/receiving a paging message according to the third embodiment of the present invention will be described.

Figure 6:
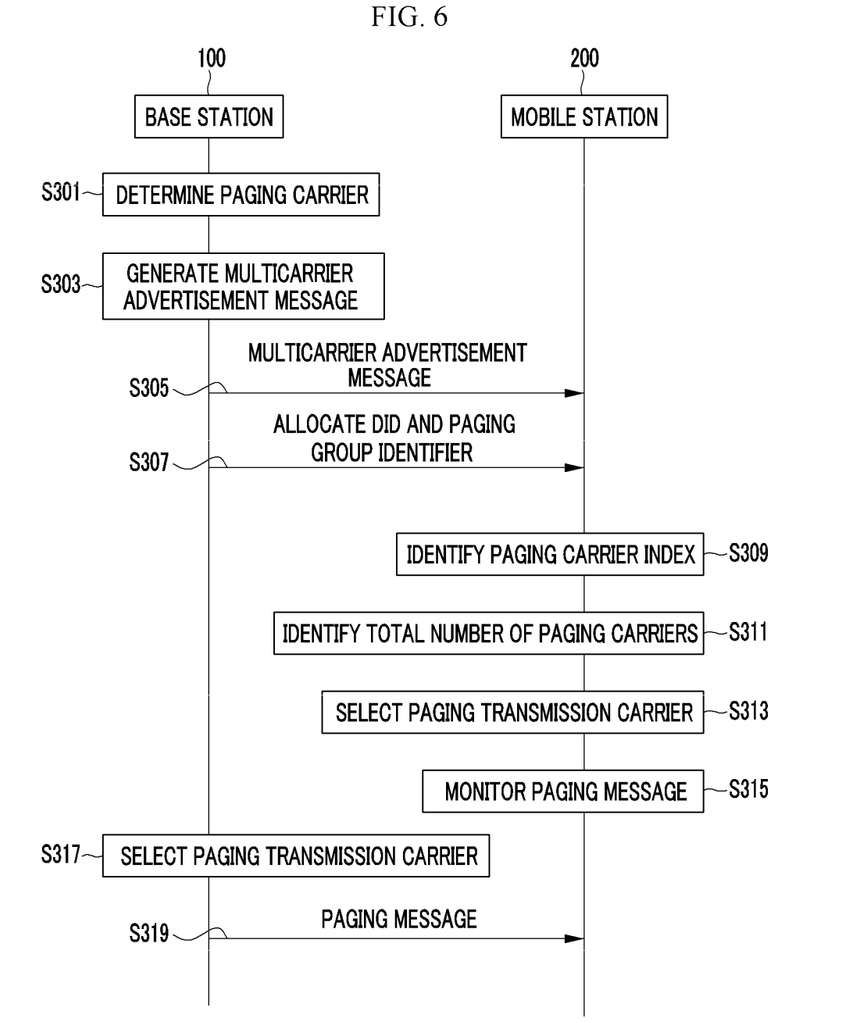
FIG. 6 shows a method for paging according to the third embodiment of the present invention.

FIG. 6 shows a method for paging according to the third embodiment of the present invention.

According to the embodiment as in FIG. 6, a base station transmits information for paging thorough multiple carriers to a mobile station by using a multicarrier advertisement message.

First, the base station determines, for each of at least one paging group, at least one paging carrier used for transmitting a paging message (S301).

In order to notify the index of the determined paging carrier for each of at least one paging group and the physical carrier indices of carriers supported by the base station to a mobile station, the base station generates a multicarrier advertisement message and transmits it to the mobile station in a broadcast fashion (S305). The mobile station may receive the multicarrier advertisement message before it is changed to be in an idle mode. Meanwhile, when the mobile station in an idle mode does not receive the multicarrier advertisement message, the mobile station may perform an additional procedure for requesting corresponding information from the base station.

Table 8 shows fields included in the multicarrier advertisement message according to the third embodiment of the present invention.

TABLE 8

| Field | Size (bit) | Description |
| --- | --- | --- |
| Multicarrier Configuration change count | 4 | Incremented by 1 upon each update |
| Serving BS Carrier Number | 3 | |
| Serving BS Uniformity Flag | 1 | 0: All Carriers supported by serving ABS have the same protocol version, SFH_Info<br>1: Otherwise |
| Physical carrier index of current carrier | 6 | The carrier that ABS broadcasts this message; the physical carrier index refers to AAI_Global-Config message |
| MAC protocol version | 8 | Consistent with REV.2 definition, with new MAC protocol version 9 defined for 16 m |

TABLE 8-continued

| Field | Size (bit) | Description |
|---|---|---|
| Paging carrier indication bit | 1 | This bit is used to specify if a carrier is a paging carrier or not. 1: The corresponding carrier is a paging carrier |
| Num_PGIDs | 2 | Number of paging groups in the current carrier Present if paging carrier indication bit = 1 |
| For (j=0;j<Num_PGIDs;j++){ | | |
| PGID | 16 | Identifier of paging group Present if Num_PGIDs > 0 |
| } | | |
| PG_uniformity flag | 1 | 1: All carriers supported by serving ABS have the same paging group 0: Otherwise |
| For (i=1 ;i<=Serving BS Carrier Number-1 ;i++){ | | |
| Physical carrier index | 6 | //physical carrier index in AAI_Global-Config message |
| SA-Preamble Index | 10 | |
| Paging carrier Indication bit | 1 | This bit is used to specify if a carrier is a paging carrier or not. 1: The corresponding carrier is a paging carrier |
| If(PG_uniformity_flag==0){ | | |
| Num_PGIDs | 2 | Number of Paging groups in the carrier Present if paging carrier indication bit = 1 |
| For (j=0;j<Num_PGIDs;j++){ | | |
| PGID | 16 | Identifier of paging group Present if Num_PGIDs > 0 |
| } | | |
| } | | |
| SFH information | | |
| } | | |

As shown in Table 8, the multicarrier advertisement message according to the third embodiment of the present invention includes a multicarrier configuration change count field, a serving base station carrier number field, a serving base station uniformity flag, a physical carrier index field of current carrier, a MAC protocol version field, a paging carrier indication bit of the current carrier, a paging group number field (Num_PGIDs) supported by the current carrier, a paging group identifier field of at least one paging group supported by the current carrier, a paging group uniformity flag (PG_uniformity flag), a physical carrier index of each serving base station carrier except for the current carrier, a secondary advanced preamble index (SA-Preamble index) of each serving base station carrier except for the current carrier, a paging carrier indication field of each serving base station carrier except for the current carrier, a paging group number field supported by each serving base station carrier except for the current carrier, a paging group identifier of at least one paging group supported by each serving base station carrier except for the current carrier, and a superframe header information field (SFH information).

The paging carrier indication field set as "1" represents that a paging message may be transmitted through a related serving base station carrier.

In Table 8, the number N of carriers used for transmitting a paging message of each paging group corresponds to the total number of carriers supporting a corresponding paging group in the multicarrier advertisement message.

When paging groups supported by each carrier in a base station are the same, the paging group uniformity flag (PG_uniformity flag) is set as "1", and the paging group number field (Num_PGIDs) supported by a current carrier and the paging group identifier field of at least one paging group supported by the current carrier, are provided. However, the paging group number field supported by each serving base station carrier except for the current carrier and the paging group identifier of at least one paging group supported by each serving base station carrier except for the current carrier may not be provided.

Meanwhile, the base station allocates a Deregistration identifier (DID) and a paging group identifier to the mobile station that is entering into an idle mode (S307).

The mobile station identifies at least one paging carrier index for the paging group to which the mobile station belongs through the multicarrier advertisement message (S309).

The mobile station identifies the total number N of paging carriers of the paging group to which the mobile station belongs through the multicarrier advertisement message (S311).

The mobile station selects one from among the at least one paging carrier index of the paging group to which the mobile station belongs by using a predetermined equation and the parameter N (S313). The mobile station may use Equation 1.

When using Equation 1, the mobile station obtains the remainder (r) obtained by dividing the DID by N, and selects, as a paging carrier index, the r-th paging carrier index from among at least one paging carrier index included in the paging group to which the mobile station belongs.

The mobile station monitors a paging message based on the paging transmission carrier corresponding to the selected paging carrier index (S315).

After this, the base station selects a paging transmission carrier for the mobile station from among at least one paging carrier of the paging group to which the mobile station belongs by using a predetermined equation (S317). The base station may also use Equation 1.

The base station transmits a paging message through the selected paging transmission carrier to the mobile station in a broadcast fashion (S319).

Next, referring to FIG. 7, a method for transmitting/receiving a paging message according to the fourth embodiment of the present invention will be described.

Figure 7:
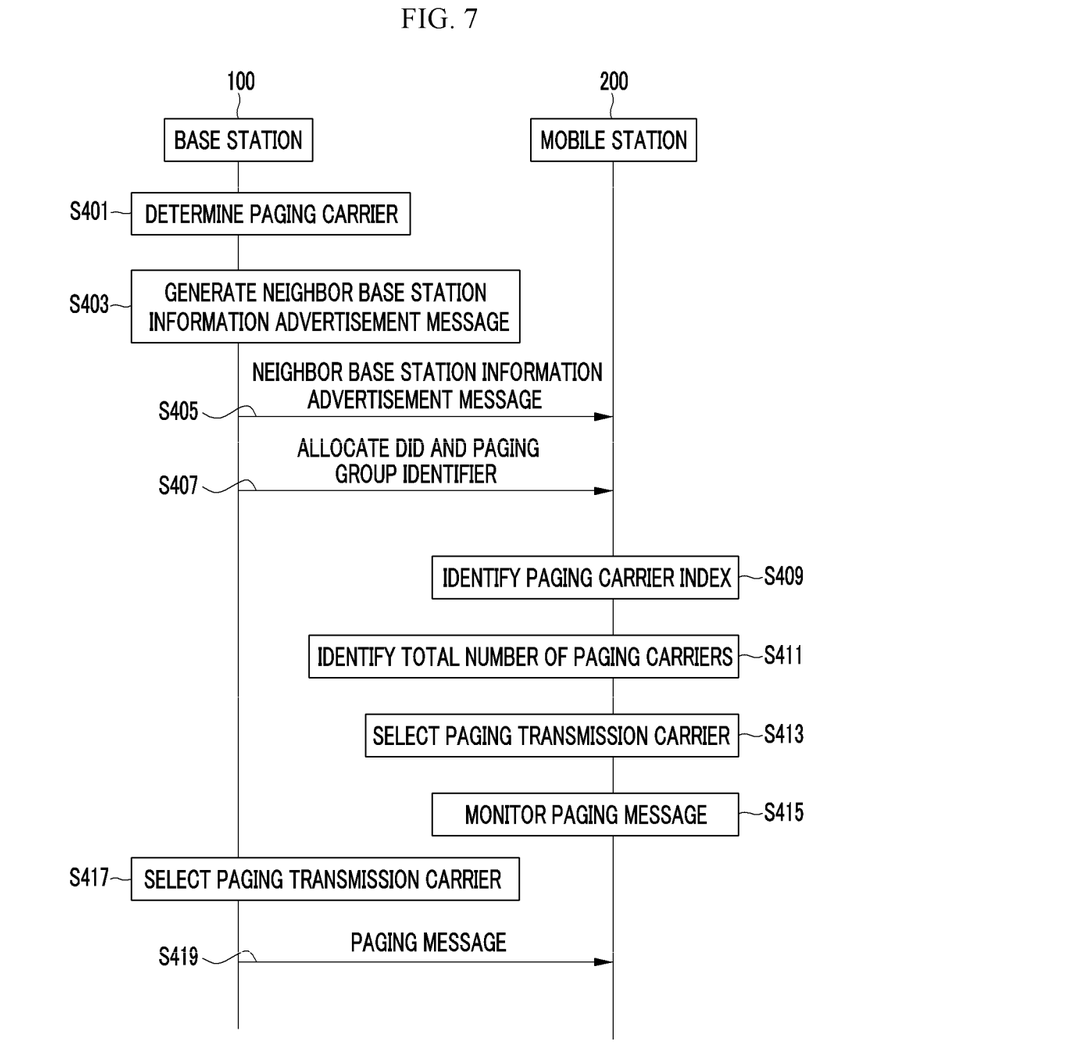
FIG. 7 shows a method for paging according to the fourth embodiment of the present invention.

FIG. 7 shows a method for paging according to the fourth embodiment of the present invention.

According to the embodiment as in FIG. 7, a base station transmits information for paging thorough multiple carriers to a mobile station by using a neighbor base station information advertisement message such as an AAI_NBR-ADV message.

First, the base station determines, for each of at least one paging group, at least one paging carrier used for transmitting a paging message (S401).

In order to notify the index of the determined paging carrier for each of at least one paging group and the physical carrier indices of carriers supported by the base station to a mobile station, the base station generates a neighbor base station information advertisement message (S403) and transmits it to the mobile station in a broadcast fashion or a unicast fashion (S405). The mobile station may receive the neighbor base station information advertisement message before it is changed to be in an idle mode. Meanwhile, when the mobile station in an idle mode does not receive the neighbor base station information advertisement message, the mobile station may perform a procedure for requesting corresponding information from the base station.

Table 9 shows fields included in the neighbor base station information advertisement message according to the fourth embodiment of the present invention.

TABLE 9

| Syntax | Size | Note |
|---|---|---|
| AAI_NBR-ADV_Message_format( ){ | ... | ... |
|     Management Message Type = NN | 8 | |
|     Change count | 3 | |
|     Cell type | 3 | |
|     Total Number of AAI_NBR-ADV segments | 4 | |
|     AAI_NBR-ADV Segment Index | 4 | |
|     BS number M | 8 | |
|     Starting ABS index | 8 | |
|     For (i=0;i<M;i++){ | | |
|         BSID | 48 | |
|         Number of carriers (NC) | | |
|         For (j=0;j<Nc;j++){ | | |
|             SA-PREAMBLE index | 10 | |
|             A-PREAMBLE transmit power | 8 | |
|             Physical carrier index | 6 | Refers to the physical carrier index in AAI_Global-Config message |
|             MAC protocol versions | 8 | MAC protocol version of the BS consistent with REV.2 definition, with new MAC protocol version 9 defined for 16 m |
|             Paging carrier indication | 1 | This bit is used to specify if a carrier is a paging carrier or not. 1: The corresponding carrier is a paging carrier |
|             Num_PGIDs | 2 | Number of paging groups in the carrier Present if paging carrier indication bit = 1 |
|             For (k=0;k<Num_PGIDs;k++){ | | |
|                 PGID | 16 | Identifier of paging group Present if Num_PGIDs > 0 |
| } | | |
| ... | ... | ... |

As in Table 9, the neighbor base station information advertisement message according to the fourth embodiment of the present invention includes a management message type field, a change count field, a cell type field, a total segment number field, a segment index field, a base station number field, a start base station index field, a base station identifier field of each base station, a carrier number field for each carrier of each base station, a preamble transmission power field (A-PREAMBLE transmit power) for each carrier of each base station, a physical carrier index field for each carrier of each base station, a MAC protocol version field for each carrier of each base station, a paging carrier indication field for each carrier of each base station, a field representing the number of paging groups supported by each carrier, and a paging group identifier of at least one paging group supported by each carrier of each base station.

The paging carrier indication field set as "1" represents that a paging message may be transmitted through a carrier corresponding to a related physical carrier index.

In Table 9, the number N of carriers used for transmitting a paging message of each paging group corresponds to the total number of carriers supporting a corresponding base station in the neighbor base station information advertisement message.

Meanwhile, the base station allocates a deregistration identifier (DID) and a paging group identifier to a mobile station that is entering into an idle mode (S407).

A mobile station identifies an index of at least one paging carrier for the paging group of the base station to which the mobile station belongs by using the base station identifier field of the neighbor base station information advertisement message (S409).

The mobile station identifies the total number N of paging carriers for the paging group to which the mobile station belongs through the paging group information message (S411).

The mobile station selects one from among the at least one paging carrier index supporting the paging group to which the mobile station belongs by using a predetermined equation (S413). The mobile station may use Equation 1. When using Equation 1, the mobile station obtains the remainder (r) obtained by dividing the DID by N, and selects, as a paging carrier index, the r-th paging carrier index from among at least one paging carrier index supporting the paging group to which the mobile station belongs.

The mobile station monitors a paging message through the paging transmission carrier corresponding to the selected carrier index (S415).

After this, the base station selects a paging transmission carrier for the mobile station from among at least one paging carrier of the paging group to which the mobile station belongs by using a predetermined equation (S417). The base station may also use Equation 1.

The base station transmits a paging message through the selected paging transmission carrier to the mobile station in a broadcast fashion (S419).

The mobile station in an idle mode may inform the base station of the necessity of information on paging carriers through a location update procedure when a carrier does not support paging after receiving the paging group information message through the carrier. At this time, a message for location update includes a paging carrier index request. If a panging carrier index request field is set, it represents that a mobile station requests to provide information on paging carriers.

In addition to the described embodiments, it is possible to use a method that a base satation determines a paging transmission carrier and then inform a mobile station, which is entering into an idle mode, thereof.

Next, referring to FIG. 8 and FIG. 9, the structure of a base station 100 and a mobile station 200 according to an embodiment of the present invention will be described.

Figure 8:
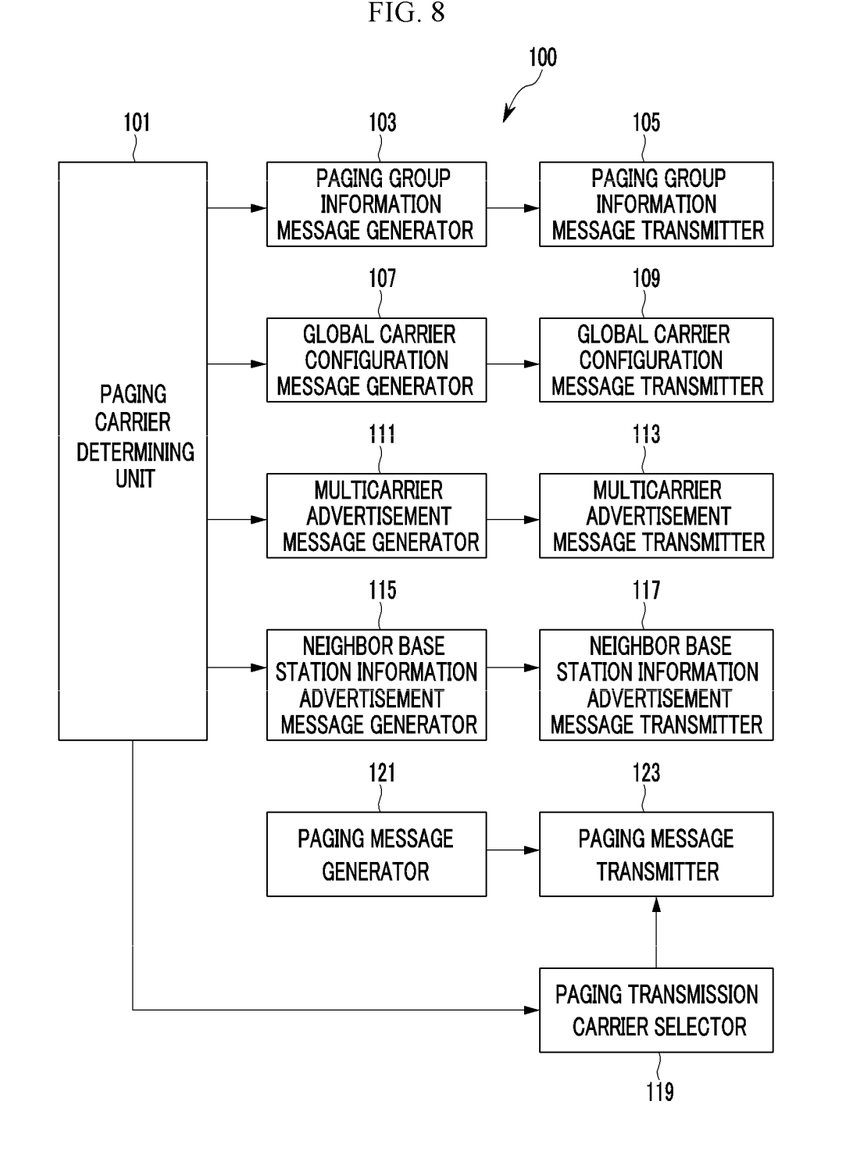
FIG. 8 shows a block diagram of a base station according to an embodiment of the present invention.

FIG. 8 shows a structure of a base station according to an embodiment of the present invention.

As shown in FIG. 8, a base station 100 according to an embodiment of the present invention includes a paging carrier determining unit 101, a paging group information message generator 103, a paging group information message transmitter 105, a global carrier configuration message generator 107, a global carrier configuration message transmitter 109, a multicarrier advertisement message generator 111, a multicarrier advertisement message transmitter 113, a neighbor base station information advertisement message generator 115, a neighbor base station information advertisement message transmitter 117, a paging transmission carrier selector 119, a paging message generator 121, and a paging message transmitter 123.

The paging carrier determining unit 101 determines, for each of at least one paging group, at least one paging carrier used for transmitting a paging message.

The paging group information message generator 103 generates a paging group information message. At this time, the paging group information message may include information for informing the mobile station 200 of the index of the paging carrier supporting each of at least one paging group.

The paging group information message transmitter 105 transmits the paging group information message to the mobile station 200 in a broadcast fashion.

The global carrier configuration message generator 107 generates a global carrier configuration message.

The global carrier configuration message transmitter 109 transmits the global carrier configuration message to the mobile station 200 in a unicast fashion.

The multicarrier advertisement message generator 111 generates a multicarrier advertisement message. At this time, the multicarrier advertisement message may include information for informing the mobile station 200 of the index of the paging carrier each of at least one paging group.

The multicarrier advertisement message transmitter 113 transmits the multicarrier advertisement message to the mobile station 200 in a broadcast fashion The neighbor base station information advertisement message generator 115 generates a neighbor base station information advertisement message.

At this time, the neighbor base station information advertisement message may include information for informing the mobile station 200 of the index of the paging carrier supporting each of at least one paging group.

The neighbor base station information advertisement message transmitter 117 transmits the base station information advertisement message to the mobile station 200 in a broadcast fashion or a unicast way.

The paging transmission carrier selector 119 selects a paging transmission carrier for the mobile station 200 from among a plurality of paging carriers.

The paging message generator 121 generates a paging message.

The paging message transmitter 123 transmits a paging message to the mobile station 200 through the selected paging transmission carrier in a broadcast fashion.

Figure 9:
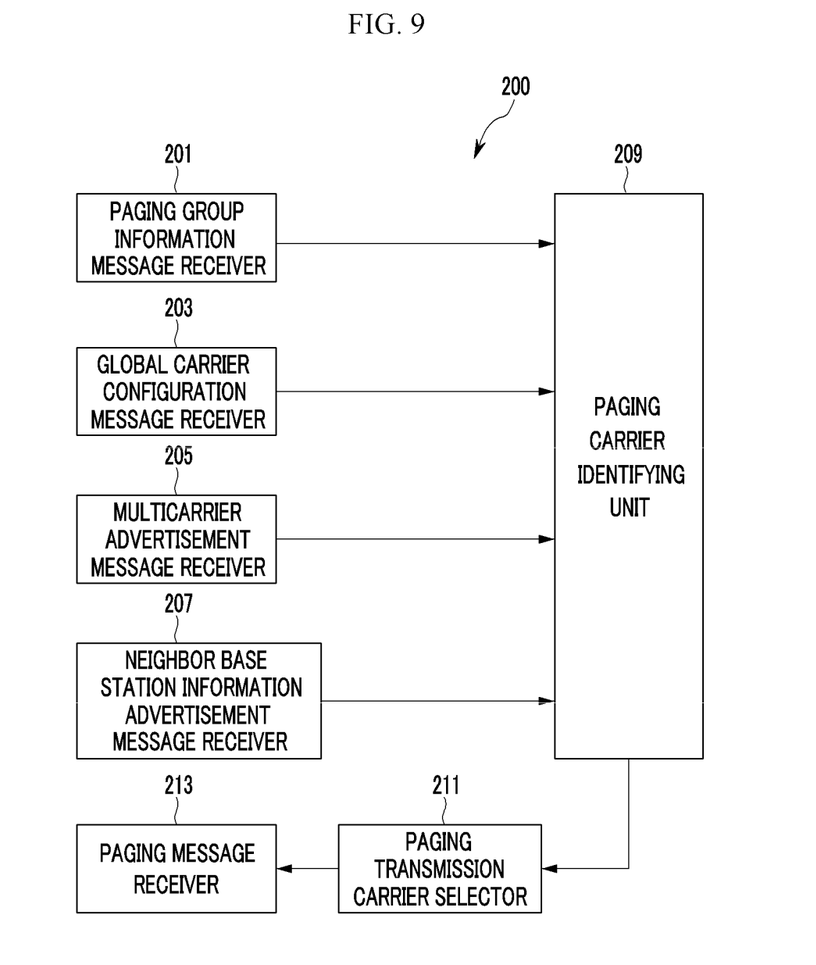
FIG. 9 shows a block diagram of a mobile station according to an embodiment of the present invention.

FIG. 9 shows a structure of a mobile station according to an embodiment of the present invention.

As shown in FIG. 9, a mobile station 200 according to an embodiment of the present invention includes a paging group information message receiver 201, a global carrier configuration message receiver 203, a multicarrier advertisement message receiver 205, a neighbor base station information advertisement message receiver 207, a paging carrier recognizer 209, a paging transmission carrier selector 211, and a paging message receiver 213.

The paging group information message receiver 201 receives the paging group information message.

The global carrier configuration message receiver 203 receives the global carrier configuration message.

The multicarrier advertisement message receiver 205 receives the multicarrier advertisement message.

The neighbor base station information advertisement message receiver 207 receives the neighbor base station information advertisement message.

The paging carrier identifying unit 209 identifies the total number N and the indices of at least one paging carrier supporting the paging group to which the mobile station 200 belongs by using information included in the paging group information message, the global carrier configuration message, multicarrier advertisement message, and the neighbor base station information advertisement message.

The paging transmission carrier selector 211 selects a paging transmission carrier for the mobile station 200 from among the at least one paging carrier supporting the paging group to which the mobile station 200 belongs.

The paging message receiver 213 monitors the paging transmission carrier to receive a paging message through the paging transmission carrier.

The above-mentioned embodiments of the present invention are not embodied only by an apparatus and method. Alternatively, the above-mentioned embodiments may be embodied by a program performing functions that correspond to the configuration of the embodiments of the present invention, or a recording medium on which the program is recorded.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting a paging message by a base station, the method comprising:
   allocating a paging group to a mobile station;
   transmitting, to the mobile station, a first control message including one or more identifiers for one or more paging groups and one or more bitmaps, wherein the one or more bitmaps correspond to the one or more paging groups, respectively, and each bitmap includes a plurality of bits corresponding to a plurality of carriers and represents whether each of the plurality of carriers corresponds to a paging carrier used for transmitting a paging message for a paging group corresponding to the each bitmap;
   selecting a paging transmission carrier for the mobile station among one or more paging carriers corresponding to the paging group allocated to the mobile station; and
   transmitting the paging message through the paging transmission carrier.

2. The method of claim 1, wherein selecting the paging transmission carrier includes selecting the paging transmission carrier based on the number of one or more paging carriers corresponding to the paging group allocated to the mobile station.

3. The method of claim 1, further comprising transmitting a second control message including indices of a plurality of carriers and information for the plurality of carriers to the mobile station.

4. The method of claim 3, wherein the second control message corresponds to a unicast message for providing information of all available carriers in a network.

5. The method of claim 4, wherein the size of each of the one or more bitmaps is equal to the number of all the available carriers.

6. A method of receiving a paging message by a mobile station, the method comprising:
   receiving allocation of a paging group from a base station;
   receiving, from the base station, a first control message including one or more identifiers for one or more paging groups and one or more bitmaps, wherein the one or more bitmaps correspond to the one or more paging groups, respectively, and each bitmap includes a plurality of bits corresponding to a plurality of carriers and represents whether each of the plurality of carriers corresponds to a paging carrier used for transmitting a paging message for a paging group corresponding to the each bitmap;

selecting a paging transmission carrier for the mobile station among one or more paging carriers corresponding to the paging group allocated to the mobile station; and monitoring the paging message through the paging transmission carrier.

7. The method of claim 6, wherein selecting the paging transmission carrier includes selecting the paging transmission carrier based on the number of one or more paging carriers corresponding to the paging group allocated to the mobile station.

8. The method of claim 6, further comprising receiving a second control message including indices of a plurality of carriers and information for the plurality of carriers from the base station.

9. The method of claim 8, wherein the second control message corresponds to a unicast message for providing information of all available carriers in a network.

10. The method of claim 9, wherein the size of each of the one or more bitmaps is equal to the number of all the available carriers.

* * * * *